United States Patent [19]
Chory et al.

[11] Patent Number: 5,421,656
[45] Date of Patent: Jun. 6, 1995

[54] SPACER FOR A HELICOPTER MAIN ROTOR SHAFT

[75] Inventors: Anthony G. Chory, Trumbull, Conn.; Mark L. Thorn, Newburgh, N.Y.; Charles Geffert, Seymour, Conn.; Jeffrey A. Holmes, Bridgeport, Conn.; William J. Sobanik, Stratford, Conn.; Edward J. Karedes, Cheshire, Conn.

[73] Assignee: United Technologies Corporation, Hartford, Conn.

[21] Appl. No.: 166,539

[22] Filed: Dec. 14, 1993

[51] Int. Cl.$^6$ .................. F16C 23/08; F16C 27/04; F16C 43/04
[52] U.S. Cl. .................. 384/585; 384/551; 384/558; 384/581; 416/244 R
[58] Field of Search .................. 416/244 R; 384/494, 384/495, 517, 520, 535, 537, 548, 551, 558, 563, 581, 585

[56] References Cited

U.S. PATENT DOCUMENTS

| Re. 30,210 | 2/1980 | Buono et al. | 384/581 |
| 2,885,583 | 5/1959 | Zunick et al. | 384/535 |
| 3,645,644 | 2/1972 | Schwisow | 416/244 R |
| 4,201,426 | 5/1980 | Garten et al. | 384/563 |

*Primary Examiner*—Thomas R. Hannon
*Attorney, Agent, or Firm*—Terrance J. Radke

[57] ABSTRACT

A spacer (10) for a helicopter main rotor shaft (102) is mounted in combination with the main rotor shaft (102) and is operative to support the inner race (116) of the upper bearing assembly (110) of the main rotor shaft (102) and is concomitantly operative to restrain axial migration of the inner race (116). The spacer (10) comprises a body member (11) having a stepped configuration defined by an upper cylindrical segment (12) and a lower cylindrical segment (20) to accommodate the outer structural envelope of the main rotor shaft (102). The upper cylindrical segment (12) includes an upper annular collar (14), an intermediate annular collar (16), and a lower annular collar (18), and the lower cylindrical segment (20) includes an interface annular collar (22) and a bottom annular collar (24). Structural continuity between the upper and lower cylindrical segments (12, 20) is provided by the lower annular collar (18) and the interface annular collar (22) and a plurality of reaction spokes (30) that extend between the upper annular collar (14) and the bottom annular collar (24). The reaction spokes (30) react the bearing migration loading exerted by the inner race (116). The upper annular collar (14) includes an annular shoulder (26) that engages the inner race (116) of the upper bearing assembly (110) to support the inner race (116) and to concomitantly restrain axial migration thereof. The endface surface (24E) of the bottom annular collar (24) selectively abuttingly engages the endface of a planetary carrier (106) to support the spacer (10) in combination with the main rotor shaft (102). A plurality of flats (28) are formed on the inner surface of the bottom annular collar (24) in alignment with corresponding reaction spokes (30). The faces (28F) of the flats (28) provide the mechanical engagement between the spacer (10) and the main rotor shaft (102), and function as a pin joint to prevent bending motion of the main rotor shaft from being inducing loads into the spacer (10).

13 Claims, 4 Drawing Sheets

SPACER FOR A HELICOPTER MAIN ROTOR SHAFT

The Government has rights in this invention pursuant to Contract No. DAAJ09-92-C-0004 awarded by the Department of the Army.

TECHNICAL BACKGROUND

The present invention relates to drive shaft systems, and more particularly, to a spacer for a rotating drive shaft that supports the inner race of the upper bearing assembly of the rotating drive shaft and concomitantly restrains axial migration thereof. The present invention has particular utility for use in combination with a helicopter main rotor shaft.

BACKGROUND OF THE INVENTION

One of the most critical components of a helicopter system is the main rotor shaft. The main rotor shaft provides the mechanical interface between the main rotor assembly and the main transmission assembly and is operative to couple the mechanical power of the main transmission assembly to the main rotor assembly. In addition to its mechanical power coupling function, the main rotor shaft reacts the loading, and primarily the bending loads, developed by the main rotor assembly during operation thereof, and couples such loads into the fuselage of the helicopter.

The power transmitted by the main rotor shaft is in the form of torque, i.e., a rotational motion. The main rotor shaft is mounted in rotational combination with the gearbox housing that encases the main transmission assembly. Bearing assemblies, e.g., roller bearings, are utilized to mount the main rotor shaft in rotatable combination with structural elements of the gearbox housing.

FIG. 1 is a partial cross-sectional view of a UH-60A BLACK HAWK® helicopter (BLACK HAWK is a registered trademark of the Sikorsky Aircraft Division of United Technologies Corporation) gearbox housing 100 illustrating a main rotor shaft 102 disposed in operative combination with a main transmission assembly that includes a main module 104 for coupling torque developed by the engine system (not shown) to the main rotor shaft 102. The illustrated main module 104 is an epicyclic gear train wherein the planetary carrier 106 is clamped in combination with the main rotor shaft 102 by the abutting engagement of the free end of the planetary carrier 106 with an unstressed annular shoulder 102AS formed in the base of the main rotor shaft 102.

The main rotor shaft 102 is rotatably mounted in combination with the gearbox housing 100 by means of an upper bearing assembly 110 and a lower bearing assembly 130. The upper bearing assembly 110 comprises a bearing housing 112, a bearing element 114, e.g., a roller bearing, an inner race 116, and an outer race 118 (see also FIG. 1A). The upper bearing assembly 110 typically utilizes a locking device 120 such as a clip, a retention screw, or a set screw to secure the inner race 116 in fixed combination with a notch 102N formed in the main rotor shaft 102 (see FIGS. 1, 1A which also illustrates a machined bearing shoulder 102BS supporting the lower end of the inner race 116) to prevent axial migration thereof.

The bending loads induced in the main rotor shaft 102 by the main rotor assembly cause fatigue loading thereof and are the primary factor which determines the useful service life of the main rotor shaft 102. The main rotor shaft 102 is sensitive to fretting and/or notching which exacerbate the deleterious effects of the bending loads induced in the main rotor shaft 102. Fretting, which arises as a result of metal rubbing, may cause micro-tears in the affected surface areas of the main rotor shaft 102 that leads to crack development and propagation in the main rotor shaft 102, which severely limits the useful service life of the main rotor shaft 102. Notching of the main rotor shaft 102 to facilitate securement of the inner race 116 of the upper bearing assembly 110 in fixed combination with the main rotor shaft 102 (utilizing a locking device 120) creates a stress concentration zone in the main rotor shaft 102 which is susceptible to fretting and restricts the useful life of the main rotor shaft 102.

The inventors have recognized several interrelated mechanisms which adversely affect the service life of the helicopter main rotor shaft 102. The inventors have determined that the upper bearing assembly 110 utilized to mount the main rotor shaft 102 in rotatable combination with the gearbox housing 100 is subject to bearing creep under loading conditions. During thrust generation as a result of operation of the main rotor assembly, the main rotor shaft 102 experiences a vertical thrust deflection, e.g., for the UH-60A BLACK HAWK® main rotor shaft 102 described hereinabove, a vertical deflection of about 0.030 inches. The vertical deflection of the main rotor shaft 102 causes the bearing element 114 to unseat from the shoulder 118S of the outer race 118 (see FIG. 1A).

Concomitantly, the upper bearing assembly 110 is subjected to asymmetrical side loading due to the moments generated by operation of the main rotor assembly, which induce bending loads in the main rotor shaft 102. The inner race 116 of the upper bearing assembly 110 experiences a slight expansion as a result of bearing side loading, which creates a small gap between the inner race 116 and the main rotor shaft 102. The small gap allows the inner race 116 of the bearing assembly 110 to "walk" around the main rotor shaft 102, i.e., bearing creep. Bearing creep causes fretting stresses to be induced in localized areas of the main rotor shaft 102 due to the asymmetrical bearing side loading. Bearing creep also causes the inner race 116 to migrate axially down the main rotor shaft 102. Large frictional forces are developed between the migrating inner race 116 and the main rotor shaft 102 which cause further fretting stresses to be induced in the main rotor shaft 102.

When the thrust-generating operation of the main rotor assembly is terminated, the thrust force that caused the vertical displacement of the main rotor shaft ceases. The weight of the rotor head causes an opposite vertical displacement of the main rotor shaft 102 such that further frictional forces are developed between the inner race 116 and the main rotor shaft 102. The walking motion and axial displacement of the inner race 116 described above subject the main rotor shaft 102 to fretting, and result in a significant deterioration in the service life of the main rotor shaft 102.

Prior art solutions to preclude axial migration of the inner race 116 of the upper bearing assembly 110 involved the use of locking devices 120 such as clips, cotter pins, retention screws, or set screws utilized in combination with the machined shoulder to inhibit migration of the inner race. However, it has been found that locking devices tend to induce a fretting fatigue condition in the main rotor shaft 120, which decreases the useful service life thereof. For example, the UH-60A uses bearing retention screws 120 that mechanically engage a shaft notch 102N to restrain the axial migration of the bearing assembly inner race 116 vis-a-vis the main rotor shaft 102. Empirical determinations have shown that the service life of the main rotor shaft 102 of the UH-60A BLACK HAWK ® helicopter as described hereinabove is about 1,000 hours.

A need exists for a means for supporting the inner race of the upper bearing assembly of a main rotor shaft, and concomitantly, for restraining the axial migration of the inner race without adversely affecting the service life of the main rotor shaft. The support/restraint means should be configured to react the creep loading exerted by the inner race, and in particular, asymmetrical creep loading, without over stressing. The support/restraint means should have a configuration that precludes buckling thereof during reaction of creep loading. Furthermore, the support/restraint means should be configured to preclude loads from being induced therein as a result of main rotor shaft bending. The support/restraint means should have a configuration that minimizes fretting or notching of the main rotor shaft. The support/restraint means should not significantly increase the overall system weight of the main rotor shaft system.

SUMMARY OF THE INVENTION

One object of the present invention is to provide a spacer for use in combination with a main rotor shaft that supports the inner race of the upper bearing assembly of the main rotor shaft and concomitantly retrains the axial migration of the inner race.

Another object of the present invention is to provide a spacer for use in combination with a main rotor shaft that reacts the creep loading exerted by the inner race, and in particular, asymmetric creep loading exerted by the inner race, without over stressing.

A further object of the present invention is to provide a spacer for use in combination with a main rotor shaft that precludes buckling thereof during reaction of the inner race creep loading.

Yet another object of the present invention is to provide a spacer for use in combination with a main rotor shaft that is configured to preclude bending loads of the main rotor shaft from being induced therein.

Still a further object of the present invention is to provide a spacer for use in combination with a main rotor shaft that is configured to achieve the foregoing objectives at a minimal weight.

These and other objects of the present invention are achieved by a spacer according to the present invention that is mounted in combination with the main rotor shaft and operative to support the inner race of the upper bearing assembly of the main rotor shaft and to concomitantly restrain axial migration of the inner race. The spacer comprises a body member having an annular configuration that is complementary to the structural envelope of the main rotor shaft.

One preferred embodiment of the spacer comprises an annular body member having a stepped configuration defined by an upper cylindrical segment and a lower cylindrical segment. The upper cylindrical segment includes an upper annular collar, an intermediate annular collar, and a lower annular collar, and the lower cylindrical segment includes an interface annular collar and a bottom annular collar. Structural continuity between the upper and lower cylindrical segments is provided by the lower annular collar and the interface annular collar and a plurality of reaction spokes extending between the upper annular collar and the bottom annular collar.

Each reaction spoke is configured to react the total bearing migration loading exerted by the inner race due to the bending of the main rotor shaft. The intermediate annular collar is operative to preclude buckling of the loaded reaction spokes due to asymmetrical bearing migration loading.

The upper annular collar includes an annular shoulder that engages the inner race of the upper bearing assembly to support the inner race and to concomitantly restrain axial migration thereof. The endface of the bottom annular collar selectively abuttingly engages the endface of the planetary carrier clamped in combination with the main rotor shaft to support the spacer in combination with the main rotor shaft.

A plurality of flats having a circular segment configuration are formed on the inner surface of the bottom annular collar, preferably in alignment with the reaction spokes. The faces of the flats mechanically engage the main rotor shaft and function as a pin joint to prevent the bending motion of the main rotor shaft from inducing loads into the spacer.

BRIEF DESCRIPTION OF THE DRAWINGS

A more complete understanding of the present invention and the attendant features and advantages thereof may be had by reference to the following detailed description of the invention when considered in conjunction with the following drawings wherein.

DETAILED DESCRIPTION OF PREFERRED EMBODIMENTS

Figure 1:
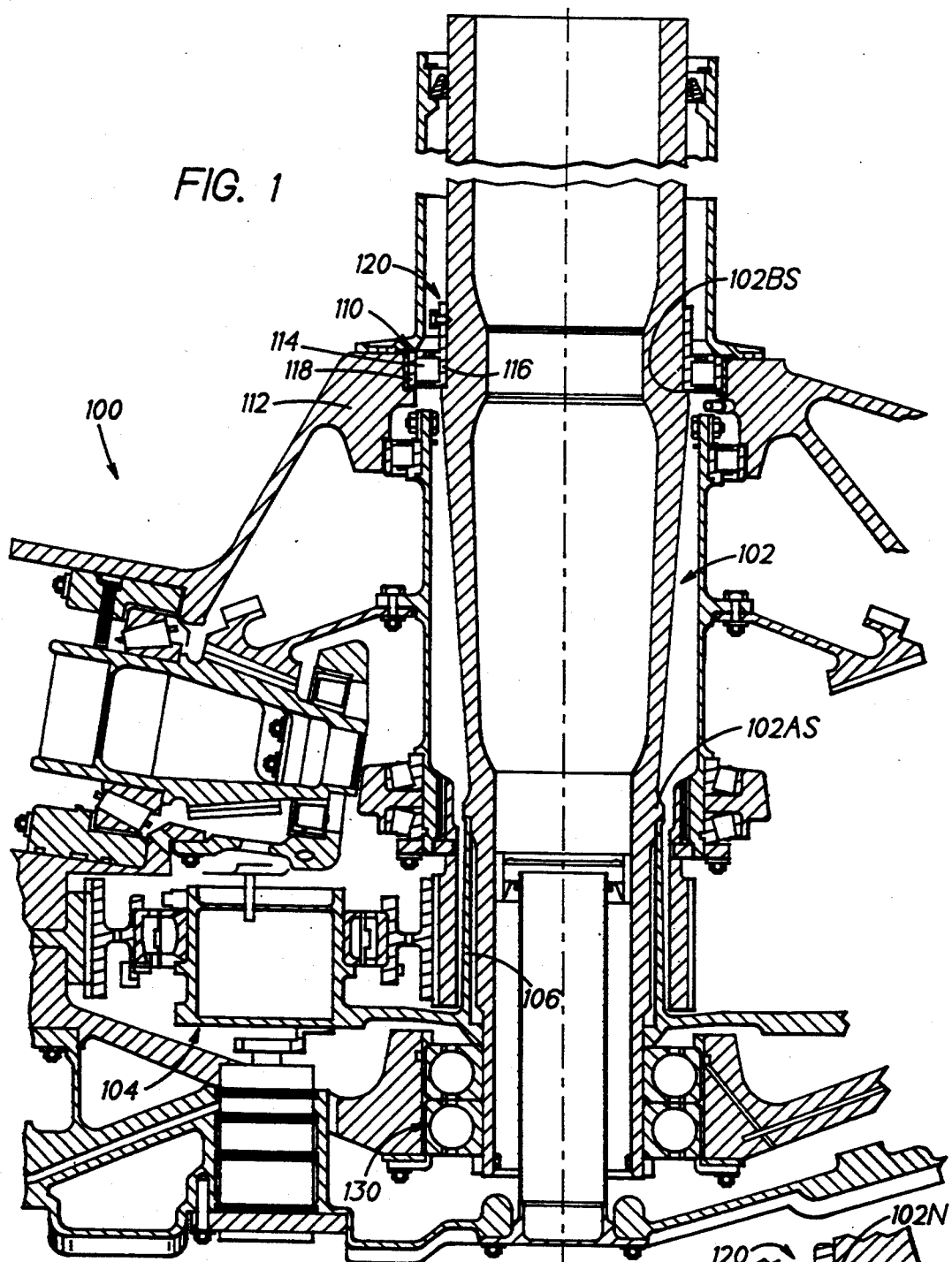
FIG. 1 is a partial cross-sectional view of a UH-60A BLACK HAWK ® helicopter main rotor shaft.
Figure 1A:
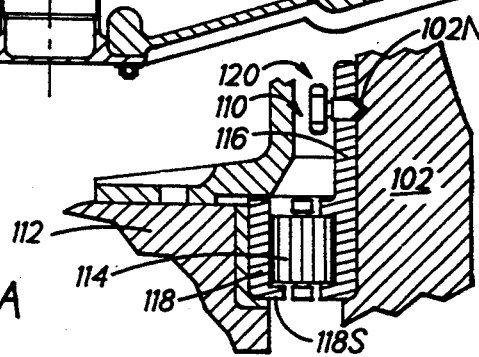
FIG. 1A is an enlarged view of the upper bearing assembly supporting the helicopter main rotor shaft of FIG. 1.

Referring now to the drawings wherein like reference characters identify corresponding or similar elements throughout the several views, FIGS. 2-6 illustrate a spacer 10 according to the present invention for use in combination with the helicopter main rotor shaft 102. The spacer 10 is operative to support the inner race 116 of the upper bearing assembly 110 and concomitantly, to restrain axial migration thereof, i.e., to provide axial retention thereof, without reacting the bending loads of the main rotor shaft 102 and without adversely affecting the service life of the main rotor shaft 102. The spacer 10 has a spoked configuration which allows deflection thereof without over stressing when reacting the axial migration or creep loads (described hereinafter as the bearing migration loading) exerted by the inner race 116 due to the bending of the main rotor shaft. The spacer 10 is further configured to preclude buckling of the reaction spoke(s) which react the bearing migration loading. Further, the spacer 10 includes a "pin-joint" configuration to preclude loads from being induced in the spacer 10 as a result of main rotor shaft bending. The spacer 10 is further designed optimized to accomplish the foregoing functions in a minimal weight configuration.

Figure 2:
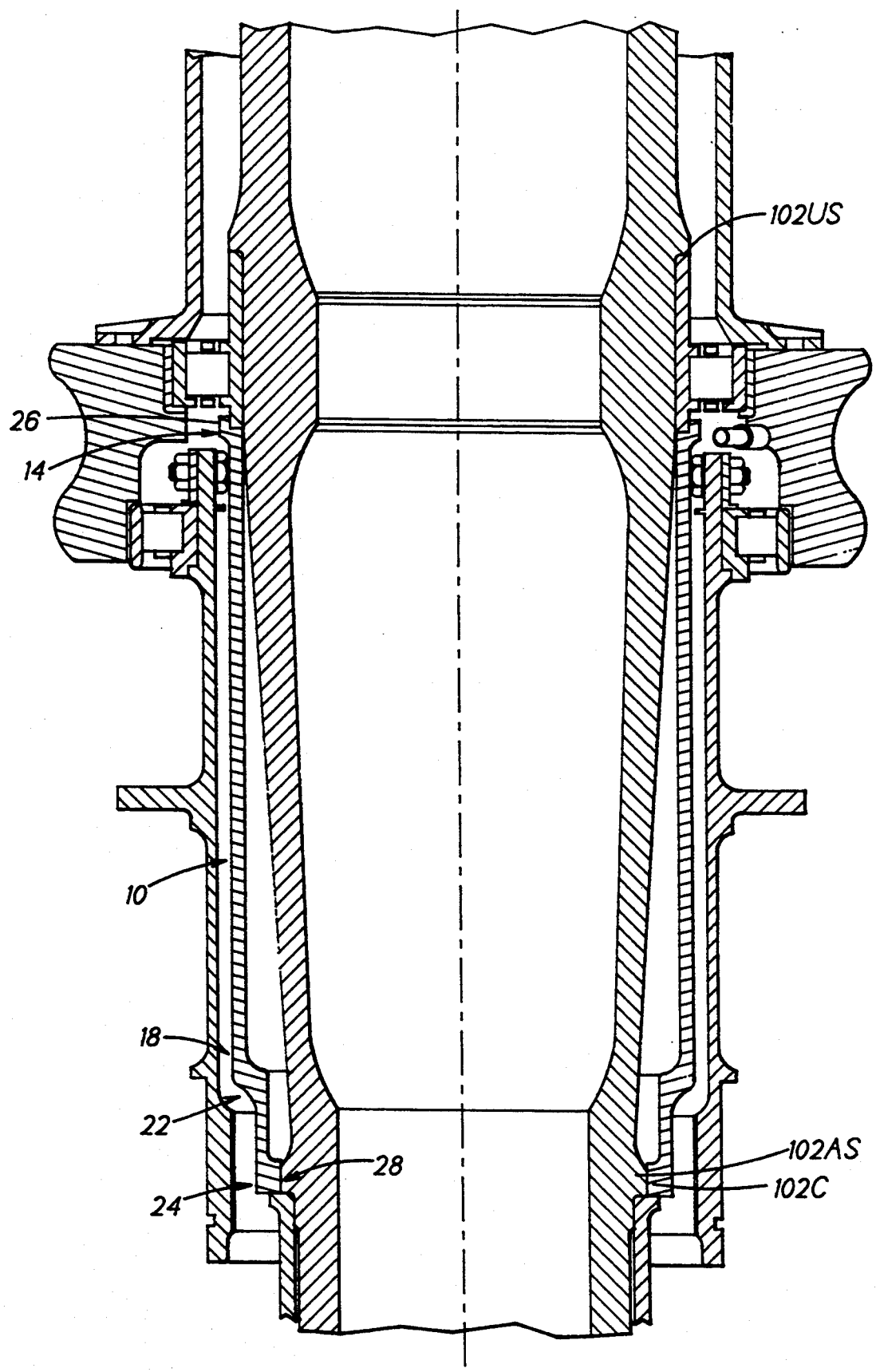
FIG. 2 is a cross-sectional view illustrating a spacer according to the present invention disposed in combination with a helicopter main rotor shaft.

The preferred embodiment of the spacer 10 according to the present invention for use in combination with a main rotor shaft 102 of the UH-60A BLACK HAWK ® Helicopter is illustrated in FIG. 2. The main rotor shaft 102 described hereinabove in conjunction with FIG. 1 is structurally modified to accommodate mounting of the spacer 10 according to the present invention in combination therewith. The modifications to the main rotor shaft 102 include the addition of an upper shoulder 102US configured for abutting engagement with the upper end of the inner race 116 of the upper bearing assembly 110 to limit upward axial migration of the inner race 116. The upper shoulder 102US and the surface area of the main rotor shaft 102 complementary to the inner race 116 are preferably flame-sprayed with a tungsten-carbide compound such as Union Carbide LW-IN40 to increase the hardness thereof and to minimize fretting interaction and wear between the inner race 116 and the corresponding surface area and upper shoulder 102US of the main rotor shaft 102. The main rotor shaft 102 as modified eliminates the need for the bearing support shoulder 102BS and the shaft notch 102N described hereinabove.

In addition, the unstressed annular shoulder 102AS of the main rotor shaft 102 is modified to accommodate the configuration of the preferred embodiment of the spacer 10 described in the following paragraphs. More specifically, a plurality of complementary channels 102C (see FIG. 2) are machined in the unstressed annular shoulder 102AS to facilitate supporting of the spacer 10 on the endface of the planetary carrier 106 as described hereinbelow.

Use of the preferred embodiment of the spacer 10 according to the present invention in combination with the main rotor shaft 102 modified as described in the preceding paragraphs provides an enhanced service life for the main rotor shaft 102. Empirical determinations have demonstrated a service life of about 7600 hours for the modified main rotor shaft 102 having the preferred embodiment of the spacer 10 mounted in combination therewith.

Figure 3:
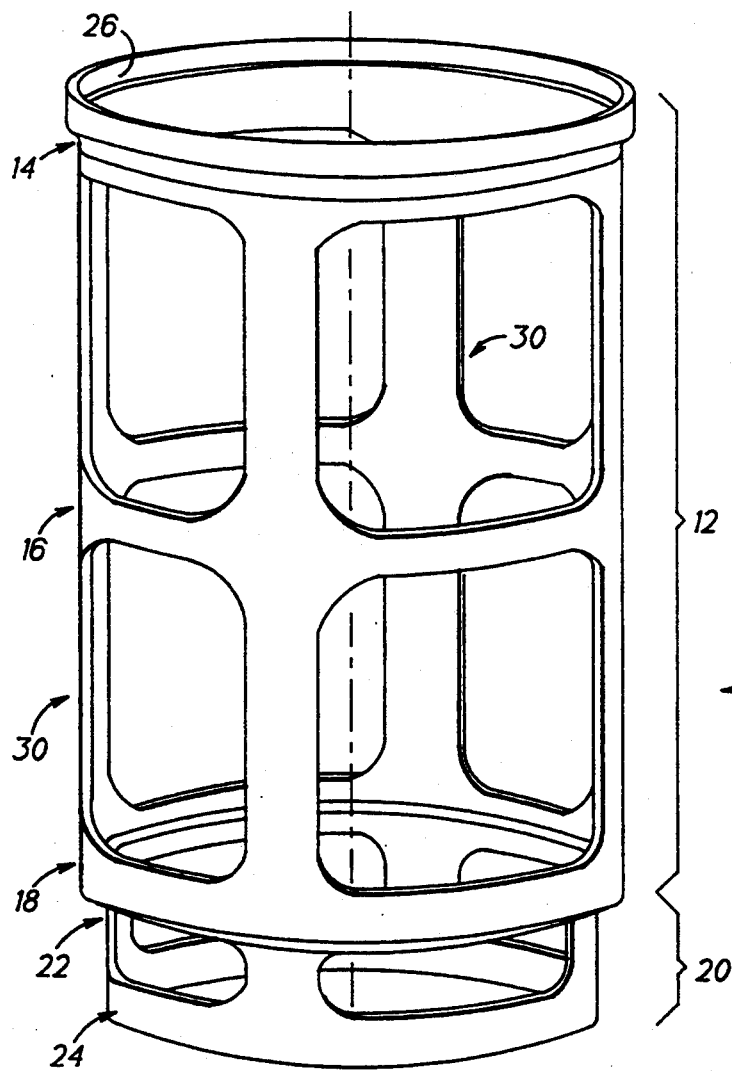
FIG. 3 is a perspective view of the spacer of FIG. 2.
Figure 4:
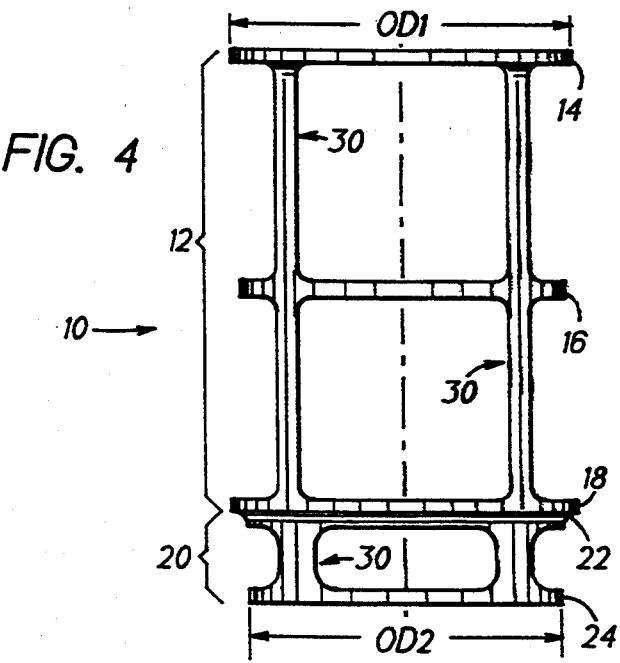
FIG. 4 is a plan view of the spacer of FIG. 3.
Figure 5:
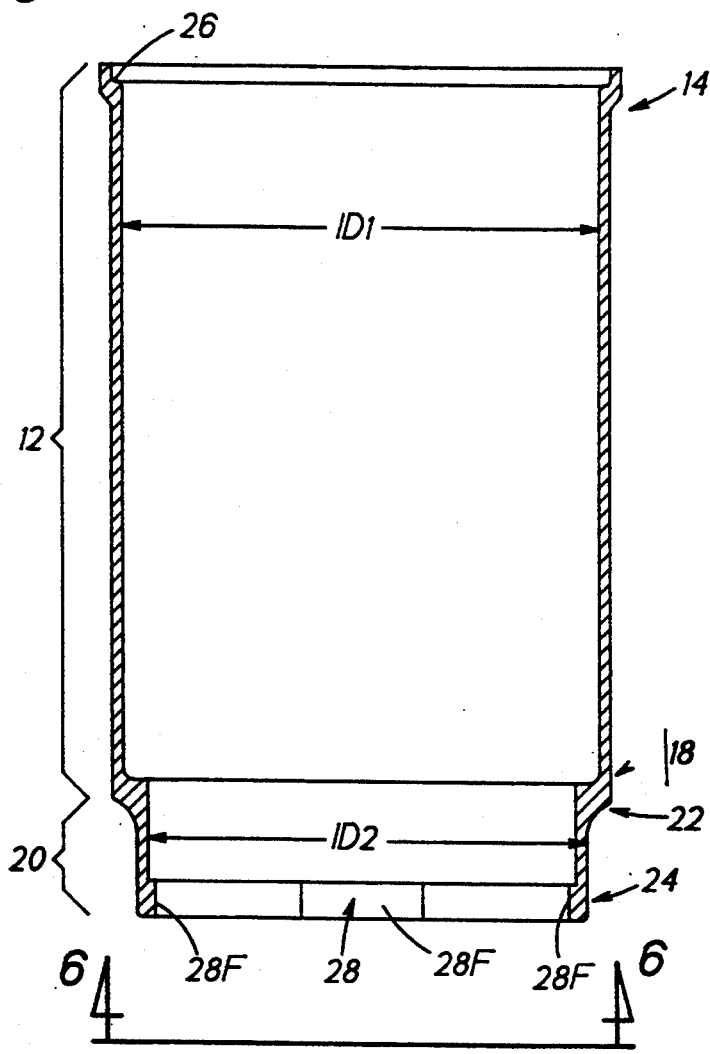
FIG. 5 is a longitudinal cross-sectional view of the spacer of FIG. 3.

The spacer 10 according to the present invention comprises a body member having an annular configuration that is complementary to the structural envelope of the main rotor shaft 102 between the upper bearing assembly 110 and the spacer support structure, e.g., the planetary carrier 106. The preferred embodiment of the spacer 10 for use in combination with the main rotor shaft 102 comprises a body member having a stepped-cylindrical configuration as illustrated in FIGS. 3-5. As a result of the configuration of the spacer 10 and the interaction thereof with the main rotor shaft 102, the spacer 10 does not need to be formed from a high strength steel, but rather may be formed from a heat treatable steel such as 4340 steel. Due to the axial length of the spacer 10 in a typical helicopter application, minimization of the overall weight of the spacer 10 is a prime consideration in the fabrication thereof. The spacer 10 is preferably formed by machining a hollow, cylindrical metal blank to the desired configuration described hereinbelow to effectuate such weight minimization. For example, the spacer 10 for the main rotor shaft 102 of the UH-60A BLACK HAWK ® helicopter has an axial length of about 11.5 inches, and is formed from a 4340 steel hollow, cylindrical blank that is approximately 12 inches in height, has an OD of about 7.5 inches, an ID of about 4.75 inches, and a weight of about 90 pounds. The blank is machined to form the preferred embodiment of the spacer 10 having the funcional configuration described hereinbelow that weighs about 3.5 pounds.

The spacer 10 has a body member configuration that is defined by an upper cylindrical segment 12 and a lower cylindrical segment 20 wherein the outer and inner diameters OD1, ID1 of the upper cylindrical segment 12 are greater than the outer and inner diameters OD2, ID2 of the lower cylindrical segment 20 (see FIGS. 4-5). The stepped configuration of the body member comprising the spacer 10 is necessary to accommodate the configuration of the main rotor shaft 102 (see FIG. 2) and is a design trade-off involving manufacturing constraints and costs. Optimally, the preferred embodiment of a spacer for the main rotor shaft 102 of a UH-60A BLACK HAWK ® helicopter would have a frustoconical configuration to complement the tapered outer structural envelope defining the main rotor shaft 102 between the upper bearing assembly 110 and the planetary carrier 106 interconnection. However, from a manufacturing standpoint, the frustoconical configuration is relatively expensive to fabricate. The stepped configuration of the body member comprising the spacer 10 according to the present invention complements the existing shaft-carrier envelope described hereinabove by proper sizing of the outer and inner diameters OD1, ID1, OD2, ID2 of the upper and lower cylindrical segments 12, 20. Furthermore, the stepped configuration of the spacer 10 described herein is relatively easy and inexpensive to manufacture.

The upper cylindrical segment 12 includes an upper annular collar 14, an intermediate annular collar 16, and a lower annular collar 18. The lower cylindrical segment 20 comprises an interface annular collar 22 and a bottom annular collar 24. Structural continuity between the upper and lower cylindrical segments 12, 20 is provided by forming the interface annular collar 22 integrally with the lower annular collar 18. Further structural continuity between the upper and lower cylindrical segments is provided by a plurality of reaction spokes 30 that extend between the upper annular collar 14 and the bottom annular collar 24.

Each reaction spoke 30 is configured to react the total bearing migration loading exerted by the inner race 116 due to bending of the main rotor shaft 102. Such a reaction spoke 30 configuration ensures proper functioning of the spacer 10 in the event that the bearing migration loading is asymmetrically exerted against the spacer 10. The intermediate annular collar 16 is operative to preclude buckling of the loaded reaction spoke(s) 30 by distributing the bearing migration loading acting on the loaded reaction spoke(s) 30.

For the preferred embodiment of the spacer 10 according to the present invention, four equidistantly spaced reaction spokes 30 extend between the upper annular collar 14 and the bottom annular collar 24 (see FIG. 3). Utilization of four reaction spokes 30 is a design optimization based upon weight minimization of the spacer 10 versus adequate reaction structure to accommodate the bearing migration loads exerted by the inner race 116 due to bending of the main rotor shaft 102. It will be appreciated that the spacer 10 according to the present invention may incorporate more or less than four reaction spokes 30 depending upon the particular application, although three reaction spokes 30 is considered to be the lower limit necessary to ensure that the spacer 10 is configured to adequately react bearing migration loading, and in particular, asymmetrical bearing migration loading. While the bearing migration loading reaction capability of the spacer 10 may be enhanced by utilizing more than four reaction spokes 30, the overall weight of the spacer 10 is concomitantly increased, and a trade-off analysis as to weight, fabrication costs, and bearing migration loads vis-a-vis the specific application should be conducted for embodiments of the spacer 10 incorporating more than four reaction spokes 10.

The upper annular collar 14 includes an annular shoulder 26 (see FIGS. 3, 5). The annular shoulder 26 is configured so that with the spacer 10 disposed in combination with the main rotor shaft, the annular shoulder 26 engages the lower end of the inner race 116 as illustrated in FIG. 2. The annular shoulder 26 is operative to support the inner race 116 of the upper bearing assembly 110 and concomitantly, to restrain axial migration of the inner race 116. The annular shoulder 26 is sized so that the upper annular collar 14 does not mechanically engage the main rotor shaft 102 with the lower end of the inner race 116 and the annular shoulder 26 in engaged combination. For example, for the preferred embodiment of the spacer 10 for the UH-60A BLACK HAWK ® helicopter main rotor shaft 102 there is spacing of about 0.0001 inches between the upper annular collar 14 and the outer surface of the inner race 116 of the upper bearing assembly 110. The contact surfaces of the upper annular collar 14 are preferably flame-sprayed with a tungsten-carbide compound such as Union Carbide LW-IN40 to increase the hardness thereof and to minimize fretting interaction between the contact surfaces of the upper annular collar 14 and the lower end of the inner race 116.

Figure 6:
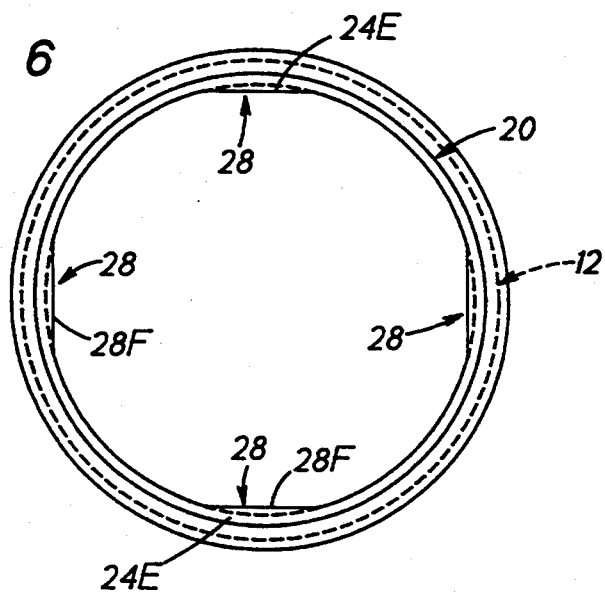
FIG. 6 is a plan view along line 6—6 of FIG. 5.

A plurality of flats 28 are formed on the inner surface of the bottom annular collar 24 (see FIGS. 5-6). The flats 28 have a circular segment configuration and are preferably aligned with the reaction spokes 30. The flats 28 are sized to interfit within the complementary channels 102C formed in the unstressed annular shoulder 102AS of the main rotor shaft 102. The faces 28F of the flats 28 mechanically engage the main rotor shaft 102, and are the only surfaces of the spacer 10 according to the present invention that mechanically interact with the main rotor shaft 102. This configuration of the spacer 10 significantly enhances the service life of the main rotor shaft 102 by reducing the probability that fretting interaction between the spacer 10 and the main rotor shaft 102 will lead to fatigue cracking of the main rotor shaft 102. The flats 28 function as a pin joint to prevent the bending motion of the main rotor shaft 102 from inducing loading into the spacer 10. The faces 28F of the flats 28 are preferably flame-sprayed with a tungsten-carbide compound such as Union Carbide LW-IN40 to increase the hardness thereof and to minimize fretting interaction between the flats 28 and the main rotor shaft 102.

The preferred embodiment of the spacer 10 according to the present invention for use in combination with the main rotor shaft 102 of the UH-60A BLACK HAWK ® helicopter described hereinabove is configured so that the endface surface 24E (see FIG. 6) of the bottom annular collar 24 selectively abuttingly engages the endface of the planetary carrier 106 (see FIG. 2) such that the spacer 10 is supported in combination with the main rotor shaft 102 by the planetary carrier 106.

That is, the endface surface 24E only those surface segments of the planetary carrier 106 that are exposed as a result of machining the complementary channels 102C in the unstressed annular shoulder 102AS. The spacer 10 is supported in combination with the main rotor shaft 102 so that the annular shoulder 26 mechanically engages the lower end of the inner race 116 as described hereinabove. The endface surface 24E of the bottom annular collar 24 is preferably flame-sprayed with a tungsten-carbide compound such a Union Carbide LW-IN40 to increase the hardness thereof and to minimize fretting interaction between the spacer 10 and the planetary carrier 106.

Flame-spraying the shoulder 26, the flats 28, and the endface surface 24E of the bottom annular collar 24 provides the necessary hardness for the interacting surfaces of the spacer 10 according to the present invention. By flame-spraying the foregoing elements, the spacer 10 according to the present invention can be fabricated from a heat treatable steel such as 4340 steel rather than a high strength steel.

A variety of modifications and variations of the present invention are possible in light of the above teachings. The spacer according to the present invention has been described hereinabove in terms of the preferred embodiment thereof for use in combination with the main rotor shaft of the UH-60A BLACK HAWK ® helicopter. One skilled in the art will appreciate that the spacer according to the present invention may have utility in combination with the main rotor shafts of other helicopters. Further, one skilled in the art will appreciate that the spacer according to the present invention may have utility in combination with other types of drive shafts. It is therefore to be understood that, within the scope of the appended claims, the present invention may be practiced otherwise than as specifically described hereinabove.

What is claimed is:

1. A spacer for use in combination with a drive shaft supported in rotatable combination by an upper bearing assembly that includes an inner race, comprising:

a body member having an annular configuration complementary to the structural envelope of the drive shaft, said body member including means for mechanically engaging the inner race for support thereof and for restraining axial migration of the inner race, means for reacting total bearing migration loading exerted by the inner race without over stressing, means for precluding buckling of said spacer due to bearing migration loading acting on said reacting means, means for supporting said spacer in combination with the drive shaft, and means for mechanically engaging the drive shaft to prevent bending motion of the drive shaft from inducing loads into said spacer and without affecting the fatigue life of the drive shaft.

2. The spacer of claim 1 wherein said body member comprises a stepped annular configuration defined by an upper cylindrical segment and a lower cylindrical segment.

3. The spacer of claim 2 wherein said upper cylindrical segment comprises an upper annular collar, an intermediate annular collar, and a lower annular collar and wherein said lower cylindrical segment comprises an interface annular collar and a bottom annular collar, structural continuity between said upper and lower cylindrical segments being provided by said lower annular collar and said interface annular collar.

4. The spacer of claim 3 wherein said reacting means comprises a plurality of equidistantly-spaced reaction spokes extending between said upper annular collar and said bottom annular collar, each of said reaction spokes being structurally configured to react the total bearing migration loading of the inner race without over stressing.

5. The spacer of claim 4 wherein said plurality of equidistantly-spaced reaction spokes comprises four equidistantly-spaced reaction spokes.

6. The spacer of claim 3 wherein buckling precluding means comprises said intermediate annular collar which is contiguous with said plurality of equidistantly-spaced reaction spokes.

7. The spacer of claim 3 further comprising a plurality of flats formed on the inner surface of said bottom annular collar, and wherein faces of said plurality of flats mechanically engage the drive shaft and function as a pin joint to prevent bending motion of the drive shaft from inducing loading into spacer.

8. The spacer of claim 3 wherein said spacer supporting means comprises selective endface segments of said bottom annular collar.

9. The spacer of claim 3 wherein said upper annular collar includes an annular shoulder that engages the inner race and is operative to support the inner race and to concomitantly restrain axial migration of the inner race.

10. A spacer for use in combination with a main rotor shaft supported in rotatable combination by an upper bearing assembly that includes an inner race, comprising:

a body member having a stepped annular configuration defined by an upper cylindrical segment and a lower cylindrical segment;

said upper cylindrical segment including an upper annular collar, an intermediate annular collar, and a lower annular collar, and said lower cylindrical segment including an interface annular segment and a bottom annular segment;

structural continuity between said upper and lower annular segments being provided by said lower annular collar and said interface annular collar;

said upper annular collar including an annular shoulder configured to engage the inner race of the upper bearing assembly for support thereof and to concomitantly restrain axial migration thereof;

said body member further including a plurality of reaction spokes extending from said upper annular collar to said bottom annular collar, each of said plurality of reaction spokes being configured to react total bearing migration loading exerted by the inner race;

said intermediate annular member interacting with said plurality of reaction spokes to preclude buckling thereof during reaction of the total bearing migration loading exerted by the inner race;

said bottom annular collar having a plurality of flats formed on the inner surface thereof, faces of said plurality of flats mechanically engaging the main rotor shaft and functioning as a pin joint to prevent bending motion of the main rotor shaft from inducing loads into said spacer; and wherein said bottom annular collar has an endface that is operative to support said spacer in combination with said main rotor shaft.

11. The spacer of claim 10 wherein said plurality of reaction spokes comprises four equidistantly-spaced reaction spokes.

12. The spacer of claim 11 wherein said plurality of flats comprises four flats, and wherein said flats are aligned with said corresponding reaction spokes.

13. The spacer of claim 10 wherein said upper cylindrical segment has an outer diameter and an inner diameter and said lower cylindrical segment has an outer diameter and an inner diameter, and wherein said outer and inner diameters of said upper cylindrical segment are greater than said outer and inner diameters, respectively, of said lower cylindrical segment.

* * * * *